Dec. 3, 1935. T. J. LITLE, JR Re. 19,778

METHOD OF MAKING EVAPORATORS

Original Filed May 8, 1926 2 Sheets-Sheet 1

INVENTOR.

BY Thomas J. Litle Jr.

Harness, Dickey & Pierce

ATTORNEYS

Dec. 3, 1935. T. J. LITLE, JR Re. 19,778

METHOD OF MAKING EVAPORATORS

Original Filed May 8, 1926 2 Sheets-Sheet 2

INVENTOR.

BY Thomas J. Litle Jr.

Harness, Dickey & Pierce

ATTORNEYS.

Reissued Dec. 3, 1935 Re. 19,778

UNITED STATES PATENT OFFICE 19,778

METHOD OF MAKING EVAPORATORS

Thomas J. Litle, Jr., Birmingham, Mich., assignor, by mesne assignments, to Copeland Refrigeration Corporation, Mount Clemens, Mich., a corporation of Michigan Original application May 8, 1926, Serial No. 107,568. Patent No. 1,712,085, dated May 7, 1929. Divided and application April 10, 1929, Serial No. 353,911. Patent No. 1,779,911, dated October 28, 1930. Application for reissue June 6, 1932, Serial No. 615,737

10 Claims. (Cl. 113—118)

My invention relates to improvements in refrigerating apparatus, and more particularly to the heat absorbing unit of the compressor type of refrigerating machine which is generically termed the expansion chamber, and is a division of my application for Letters Patent of the United States for improvements in Refrigerating apparatus filed May 8, 1926, Serial Number 107,568 issued as Patent No. 1,712,085 on May 7, 1929.

It is the primary object of any invention to provide a heat absorbing unit of a simple and cheap construction, together with a simple and cheap method of constructing the same.

With these and other objects in view, my invention consists in the arrangement, combination and construction of the various parts of my improved device as described in the specification, claimed in my claims and shown in the accompanying drawings, in which:

Figure 1:
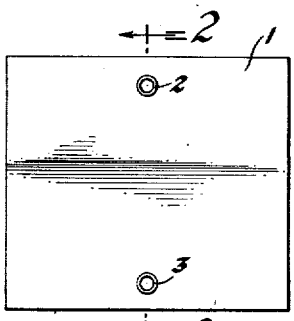
Fig. 1 is a plan view of the metal sheet which forms the base of my device.
Figure 2:
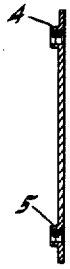
Fig. 2 is a cross section taken on the line 2—2 of Fig. 1.

In Fig. 1 I have shown a square sheet of metal 1, with circular openings 2 and 3 stamped therein adjacent the edges of two sides of the sheet, said openings 2 and 3 being formed with circular lips 4 and 5 extending outwardly at right angles to the surface of the sheet 1 as shown in Fig. 2 and said lips 4 and 5 being internally threaded to receive pipes or other threaded fittings.

Figure 3:
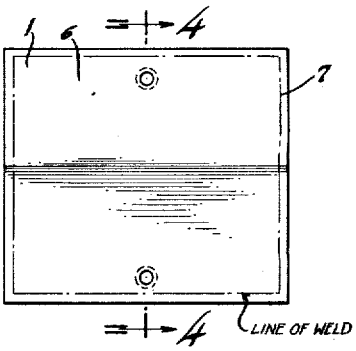
Fig. 3 is a plan view showing the second metal sheet imposed over the surface of the metal sheet which forms the base of my device, and also showing the line of weld by which the two sheets are attached.
Figure 4:
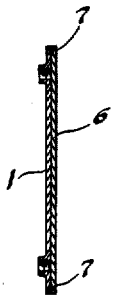
Fig. 4 is a cross section taken on line 4—4 of Fig. 3.
Figure 5:
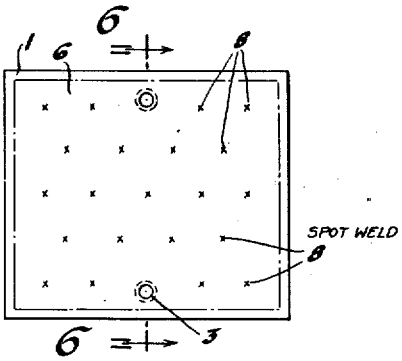
Fig. 5 is a plan view showing the second sheet imposed over the base sheet and also showing the location of spot welds by which the two sheets are, at various points within their edges, secured together.
Figure 6:
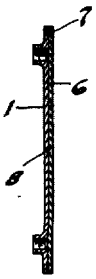
Fig. 6 is a cross section taken on line 6—6 of Fig. 5.
Figure 7:
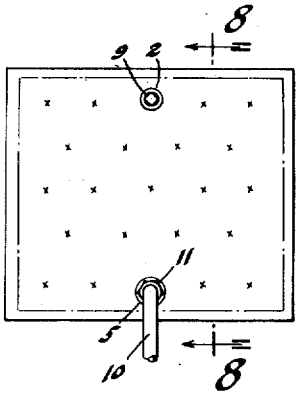
Fig. 7 is a plan view showing the means by which pressure is applied to expand the unattached inner surfaces of the sheets forming my device.
Figure 8:
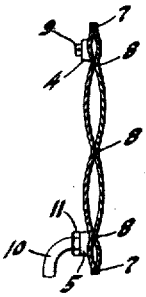
Fig. 8 is a cross section taken on line 8—8 of Fig. 7.
Figure 9:
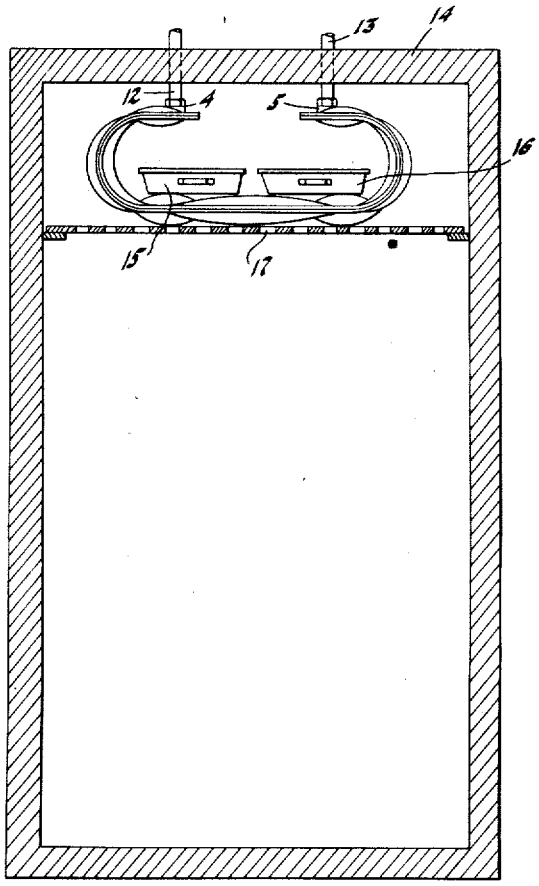
Fig. 9 is a vertical cross section of a refrigerator cabinet showing my device installed.

Metal sheet 6 is then imposed upon that side of sheet 1 which does not carry the extended lips 4 and 5. The edges of said sheet 6 are then welded to the edges of sheet 1 along the lines 7 as shown in Fig. 3. The inner and adjacent surfaces of sheets 1 and 6 are then secured to each other at spaced intervals by a plurality of spot welds 8 as shown in Fig. 5. A screw plug 9 is than inserted in lip 4, thereby closing opening 2, and a pipe 10 is then inserted in lip 5 and secured therein by fitting 11, thereby closing opening 3 as shown in Figs. 7 and 8. Air, or other like pressure is then applied through pipe 10 to expand and bend away from each other between the spot welds, the unattached inner surfaces of sheets 1 and 6, thereby producing a sufficient space between the inner surfaces of sheets 1 and 6 to permit the circulation of liquid or gas refrigerant between the surfaces of the sheets 1 and 6, and to cause such circulation to be along a devious path. The device formed, as described, by sheets 1 and 6 may then be bent as indicated in Fig. 9, (it being understood, however, that the bending may occur prior to welding and expanding), so that the lips 4 and 5 may be connected with pipes 12 and 13 extended from the heat dissipating mechanism of a refrigerating machine (not shown) through the cabinet 14. The sheets 1 and 6 thus bent and connected with the pipes 13 and 14 as shown in Fig. 9, form a basket-like, or substantially U-shaped container in which may be placed ice trays 15 and 16. This basket-like container so formed and described may be supported in the cabinet 14 by a perforated metal or wire mesh partition 17, which is attached to the inner side walls of cabinet 14 as shown in Fig. 9.

It is evident that the above described heat absorbing mechanism may be much more cheaply and easily constructed than the expansion coils, expansion chambers and brine tanks now in common use, and that it has the additional advantage of providing a container in which may be placed the various articles usually desired to be frozen. The device when in operation has a much quicker freezing action upon articles placed within it, than the expansion coils, expansion chambers and brine tanks now commonly used, because it provides for the articles to be frozen, a greater area of contact with the heat absorbing surface than is provided by the other construction mentioned, and reduces to a minimum the number of conductors through which the heat must pass before being absorbed.

It is obvious that various changes may be made in the arrangement, combination and construction of my improved device without departing from the spirit of my invention, and it is my intention to cover by my claims such changes as may be reasonably included within the scope thereof.

What I claim is:

1. The method of making a refrigerating expansion chamber which comprises superposing two sheets of metal, one of said sheets being provided with a fitting opening therein, sealing the edges of the sheets, welding the faces thereof at separated intervals and applying high pressure between the faces through said opening to separate them between the welds.

2. The method of making a refrigerating expansion chamber which consists in stamping fitting connections in a sheet of metal to which inlet and outlet fittings may be secured, placing another sheet of metal of the same size face to face with the first sheet, sealing the edges of the two sheets, welding the faces of the sheets together at separated intervals, closing one of said fitting openings and introducing a relatively high pressure between the sheets through the other fitting openings to force the sheets apart between the separated welds.

3. The method of making a refrigerant chamber which comprises superposing two substantially flat sheets of metal, one of which is provided with a fitting opening therein, sealing the edges of said sheets together, securing said sheets together against separation at a plurality of points between their edges, and then separating said sheets at all points except said edges and said plurality of points by the introduction of fluid under pressure between said plates through said opening.

4. The method of making a refrigerant chamber which comprises superposing two substantially flat sheets of metal, one of said sheets being provided with an opening therein, sealing the edges of said sheets together, securing said sheets together against separation at a plurality of points between their edges, separating said sheets at all points except said edges and said plurality of points by the introduction of fluid under pressure between said plates through said opening, and then bending said sheets to a predetermined form.

5. The method of making a refrigerant chamber which comprises superposing two substantially flat sheets of metal, one of said sheets being provided with an opening therein, sealing the edges of said sheets together, securing said sheets together against separation at a plurality of points between their edges, separating said sheets at all points except said edges and said plurality of points by the introduction of fluid under pressure between said plates through said opening, and then bending said sheets to a substantially U-shape.

6. The method of making a refrigerant expansion chamber which comprises superposing one upon another a pair of substantially rectangular metallic sheets, welding edge portions of said sheets together, welding the faces of said sheets together at separated intervals between said edge portions providing reinforcement between the walls of said chamber, forming refrigerant passageways between said welded portions, and thereafter bending said sheets to a predetermined form to provide an enclosure suitable for the reception of the trays internally thereof and for cooling the interior of a refrigerator externally thereof, the bent formation of said expansion chamber providing a relatively restricted circulation of air in the interior thereof and a relatively greater circulation of air on the exterior thereof.

7. The method of making a refrigerant expansion chamber which comprises providing a passage in a sheet of metal by deforming the sheet laterally between the edges thereof, placing a sheet of metal face to face with the first sheet, welding edge portions of the sheets together, welding the faces of the sheets together at separated intervals between said edge portions to provide reinforcement between the walls of said chamber forming refrigerant passageways between said welded portions, and thereafter bending said sheets to a predetermined form to provide an enclosure suitable for the reception of ice trays internally thereof and for cooling the interior of a refrigerator externally thereof, the bent formation of said expansion chamber providing a relatively restricted circulation of air in the interior thereof and a relatively greater circulation of air on the exterior thereof.

8. In the art of manufacturing domestic refrigerant expansion chambers, the steps which comprise: providing a unitary expansion chamber composed of rectangular metal sheets welded together at their edges and at their faces to provide reinforcement between the walls of said chamber and having refrigerant passage means between said sheets of the unit and in thereafter subjecting the unit to a bending action intermediate its ends, thereby to provide an enclosure suitable for the reception of ice trays internally thereof and for cooling the interior of a refrigerator externally thereof, the bent formation of said expansion chamber providing a relatively restricted circulation of air in the interior thereof and a relatively greater circulation of air on the exterior thereof.

9. In the art of manufacturing domestic refrigerant expansion chambers, the steps which comprise: providing a unitary expansion chamber composed of rectangular metal sheets welded together at their edges and at their faces to provide reinforcement between the walls of said chamber and having refrigerant passage means between said sheets of the unit, bending the unit intermediate its ends to provide a structure having a horizontal wall and upstanding vertical walls thereby to define a receptacle therein for ice trays and for cooling the interior of a refrigerator externally thereof, the bent formation of said expansion chamber providing a relatively restricted circulation of air in the interior thereof and a relatively greater circulation of air on the exterior thereof.

10. In the manufacture of a refrigerant expansion chamber, the steps of superimposing one upon another a pair of sheet metal members to form a substantially flat assembly thereof, welding the assembly to seal the edges of said members together, welding said members together at spaced intervals between the edges of the assembly, and thereafter bending the assembled and welded members to a desired shape suitable for the reception of ice trays internally thereof and for cooling the interior of the refrigerator by the outer surface thereof.

THOMAS J. LITLE, Jr.

CERTIFICATE OF CORRECTION.

Reissue No. 19,778. December 3, 1935.

THOMAS J. LITLE, JR.

It is hereby certified that error appears in the printed specification of the above numbered patent requiring correction as follows: Page 2, first column, line 70, claim 6, for "the" read ice; and that the said Letters Patent should be read with this correction therein that the same may conform to the record of the case in the Patent Office.

Signed and sealed this 14th day of January, A. D. 1936.

Leslie Frazer (Seal) Acting Commissioner of Patents.